United States Patent

Sullivan et al.

[11] Patent Number: 5,625,605
[45] Date of Patent: Apr. 29, 1997

[54] OPTIC BUNDLE TOWED ARRAY

[75] Inventors: Edmund J. Sullivan, Portsmouth; Frank W. Cuomo, East Providence; James G. Kelly, Newport, all of R.I.

[73] Assignee: The United States of America as represented by the Secretary of the Navy, Washington, D.C.

[21] Appl. No.: 531,794

[22] Filed: Sep. 13, 1983

[51] Int. Cl.$^6$ .................................. H04R 1/02; G02B 6/02
[52] U.S. Cl. .................................... 367/149; 367/154
[58] Field of Search .................. 73/653, 655; 181/112; 350/96.15, 96.23, 96.29, 96.33, 96.24; 367/210, 140, 49, 129, 149, 153, 154, 166, 169, 171, 172, 178, 188; 310/336

[56] References Cited

U.S. PATENT DOCUMENTS

| | | | |
|---|---|---|---|
| 3,739,326 | 6/1973 | Kerr et al. | 310/337 X |
| 4,115,753 | 9/1978 | Shajenko | 367/129 |
| 4,141,622 | 2/1979 | Beal | 350/96.23 |
| 4,199,224 | 4/1980 | Oestreich | 350/96.23 |
| 4,341,440 | 7/1982 | Trezeguet et al. | 350/96.23 |
| 4,371,234 | 2/1983 | Parfree et al. | 350/96.24 X |
| 4,375,680 | 3/1983 | Cahill et al. | 367/149 |
| 4,381,137 | 4/1983 | Berg et al. | 350/96.15 |
| 4,447,123 | 5/1984 | Page et al. | 350/96.24 |
| 4,464,013 | 8/1984 | Sabia | 350/96.23 |

Primary Examiner—Charles T. Jordan
Assistant Examiner—Brian S. Steinberger
Attorney, Agent, or Firm—Michael J. McGowan; Prithvi C. Lall; Michael F. Oglo

[57] ABSTRACT

A fiber optic bundle towed line array having a central strength member and a plurality of longitudinal optical fibers spaced around the bundle near the array outer circumference. Each fiber has at least one in-line intensity modulated optical fiber hydrophone inserted at different preselected locations therealong. Patting material is molded around and embeds the optical fibers and the strength member so as to form a small diameter integral array unit.

10 Claims, 1 Drawing Sheet

OPTIC BUNDLE TOWED ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to towed acoustic line arrays and more particularly to a fiber optic bundle towed array having a relatively small diameter, while still providing individual steerable beams.

(2) Description of the Prior Art

Conventional towed arrays are generally built of ceramic piezoelectric transducers that are distributed and mounted within a tubular sheath. The construction, size (including diameter) and spacing of these ceramic transducer elements define the frequency band of operation of the array in a water medium. Conversely, the required operating frequency places restrictions on the minimum dimensions achievable using ceramic type array elements. The sheath type array described above is generally filled with any of several types of acoustically transmitting materials which provide structural integrity together with some measure of isolation from noise-producing turbulent flow. Since array diameter has a direct correlation with turbulent flow, it is desirable for the purpose of further reducing the noise effects of this turbulent flow to have the diameter of the array be as small as possible. Most present thin-line sheath type arrays have minimum diameters of approximately one inch except for co-pending U.S. patent application Ser. No. 547,273.

Furthermore in present towed arrays, in order to provide steerable beams, the amplitude and phase information from each array transducer element must be individually transmitted to beamformer electronics external to the array. This requires that along with the transducer elements themselves, at least one telemetry wire for each element must be packaged within the array sheath. In addition, other wires are required to deliver power to each piezoelectric ceramic array element. The need for such power supply and telemetry wires places further constraints on the minimum array diameter achievable and contributes to the very high production costs. Telemetry schemes that reduce the number of wires and hence wire bundle diameter require complicated circuitry to be contained in the array proper, thus again limiting the minimum cost and diameter achievable while potentially decreasing reliability. In summary, present towed arrays have larger than desired diameters and must contend with the concomitant high flow noise associated therewith, have high manufacturing costs and provide less than desired reliability.

SUMMARY OF THE INVENTION

Accordingly, it is general purpose and object of the present invention to provide a small diameter acoustic line array. It is a further object that such a line array employ a plurality of small diameter optical fibers. Another object is that each fiber have at least one in-line hydrophone. A still further object is that each on-line hydrophone be of the intensity modulating type. Still another object is that telemetry data from the array be capable of being formed into steerable beams. A still further object is to provide a low cost towed line array which then is expendable.

These objects are accomplished with the present invention by providing a fiber optic bundle towed line array having a strength member core, a plurality of longitudinally extending single or multimode optic fiber having at least one in-line intensity modulated optical fiber hydrophone formed as an integral part thereof at a preselected location along the fiber length such that when combined with the other fibers to form a bundle a preselected interhydrophone spacing is achieved, and a light source selected to be compatible with fiber type. Patting material is molded around and embeds the optical fibers with their in-line hydrophones and the central strength member in such a way as to form a small diameter integral array unit. The light source used can be placed at the wet end or the dry end of the array. In the latter case the light can be returned to the dry end, either by incorporating a reflective surface on each fiber's distal end or by having each fiber double back to the dry end. The latter approach doubles the number of fibers and hence to some extent may increase the cross section required. The reflective end configuration permits a light beam from the light source to pass through each hydrophone twice thus providing greater sensitivity.

A more complete understanding of the invention and many of the attendant advantages thereto will be readily appreciated as the same becomes better understood by reference to the following detailed description when considered in conjunction with the accompanying drawing wherein:

DESCRIPTION OF THE PREFERRED EMBODIMENT

Figures 1, 3:
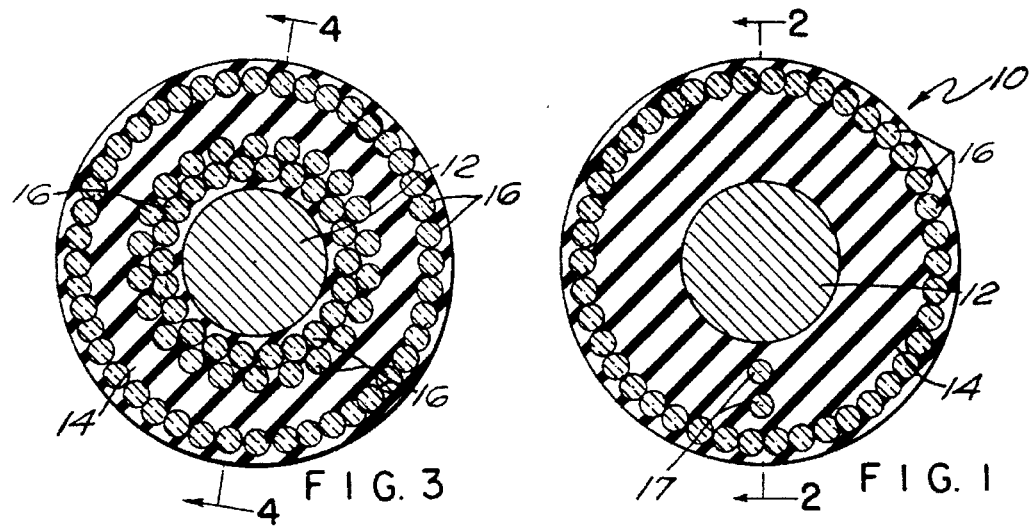
FIG. 1 shows a cross sectional view of a fiber optic bundle towed array built according to the teachings of the instant invention.
FIG. 3 shows a cross sectional view of an alternate fiber optic bundle towed array configuration built according to the teachings of the instant invention.

Referring now to FIG. 1 there is shown a cross sectional view of a typical fiber optic bundle towed array 10. Array 10 comprises a strengthening core 12 at a predetermine fiber or the like, a potting material 14 surrounding core 12 and a plurality of optical fibers 16 evenly spaced around the periphery of strengthening core 12 at a predetermined distance therefrom, such fibers being embedded within potting material 14 just below the outer surface thereof. Electrical conductors 17, used in one configuration as described more fully below, also pass through and are embedded in potting material 14. Potting material 14 further comprises a compliant silicone rubber base such as General Electric Co. RTV #31 or equivalent having appropriate fillers such as glass microballoons to make the compound neutrally buoyant while being acoustically transparent at the frequencies of interest. Each fiber 16 has as an integral part thereof, at least one in-line intensity modulated optical fiber transducer. A typical in-line intensity modulated optical transducer can be of extremely small diameter, i.e., on the order of 100 microns or less while a typical fiber is on the order of 50 microns. Such a transducer serves the purpose of receiving an incident acoustic signal, intensity modulating a light beam passing therethrough and transmitting the acoustic information thus encoded in the light beam to some desired location. Although the preferred embodiment of this invention uses one transducer element per fiber for the purpose of facilitating beamforming, this does not preclude using more than one element per fiber for other reasons, e.g., if it is desired to increase element directivity, then a plurality of elements can be grouped in series along a single fiber. Such grouping of elements would improve the behavior of the array against flow noise by making a longer effective transducer (on the order of or longer than the turbulence scale) to average out the flow noise. In addition, since the diameter of the array is determined by both the diameter of the optical fibers and the number of fibers, increasing the length of the array for a given array diameter while maintaining element spacing at $\lambda/2$ or less to avoid grating (aliasing) lobes would require more elements per fiber.

No constraints are placed on the relative spacing between the transducer elements. The array may be formed of uniformly $\lambda/2$ spaced elements, have log periodic (see U.S. Pat. No. 4,363,115) spaced elements or any other suitable element spacing. The invention permits any in-line, intensity modulated optical transducer of small diameter to be used. For example, the transducer element taught by Carome, U.S. Pat. No. 4,235,113 would apply as would many other in-line intensity type transducers. Carome's transducer can be made long relative to its diameter which can overcome the flow noise problem cited above. The present invention shows how to construct a towed array from a bundle of such transducer equipped fibers. The location of the in-line transducer along each fiber is such that, when combined to form the array bundle, a line array with preselected transducer spacing results. Since each transducer has its own dedicated fiber, the modulated light beam from each transducer is independently delivered to the array beamformer which allows individual steered beams to be formed. The resulting bundle of extremely small diameter fibers forms an array having an overall diameter significantly smaller than present line arrays. Either single mode or multi-mode optical fibers may be used. However multi-mode fibers are preferable in that a plurality of thermal light sources (such as miniature incandescent lamps), light emitting diodes, and HeNe lasers may be used vice being limited to use of lasers as is required for extraction of phase information using single mode fibers.

A fiber optic bundle towed array 10 may be implemented in any number of ways without deviating from the teachings of the present invention. If, for example, fiber 16's diameter is 50 microns and an array of 50 transducer elements (and hence 50 fibers) is desired, these fibers will form an array with a diameter of 0.25 cm where the fibers are placed around the circumference of core 12. A typical arrangement is depicted in FIG. 1 where the "n" fibers 16 of diameter "d" require a core of approximate circumference nd. This calculation assumes that multimode fibers are used. If single-mode fibers of approximate diameter 5 microns are used, the overall diameter of the array can be substantially decreased at the penalty of increased cost.

Figure 2:
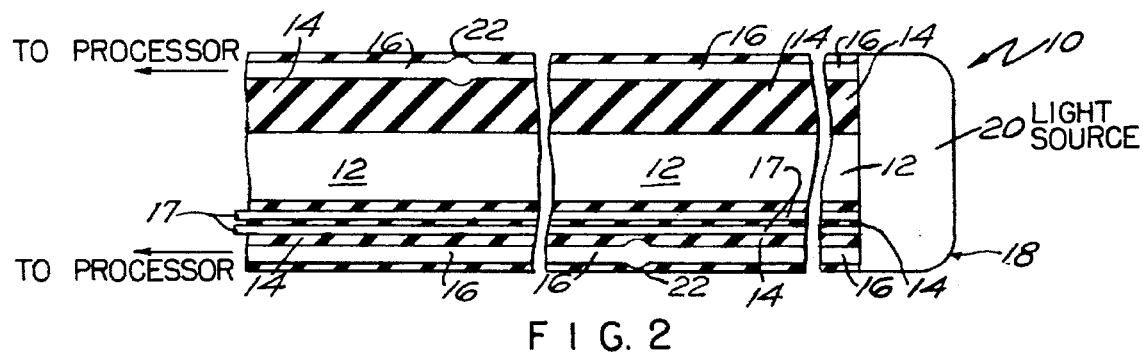
FIG. 2 is a cross sectional side view of the array of FIG. 1 taken along line 2—2 thereof.

FIG. 2 shows a cross-section of the array of FIG. 1. The distal end 18 of array 10 has incorporated thereat a light source 20 connected to each fiber 16. Light source 20 receives power from the tow vessel by means of electrical conductors 17. Each optical fiber 16 has incorporated as an integral part thereof at least one-line intensity modulated optical hydrophone 22. When light source 20 is thus placed at wet, distal end 18 of array 10, the light beam produced simply propagates directly along the fiber to and through hydrophone 22 and onward to the processor and/or beamformer.

An alternate array configuration, as shown in cross section FIG. 3, is similar to the description of FIG. 1 in all respects except that here fibers 16 are further shown as distributing light beams from an on-board light source to array hydrophones by means of the optical fibers 16 located just below the surface of potting material 14, each fiber then continuing to the wet distal end of the array where they loop back along core 16 in order to return the then modulated light beam propagating therein back to the system processor. This approach requires twice the number of fibers since a return line is needed for each fiber which increases the total path length the beam must travel somewhat reducing the light level.

Figure 4:
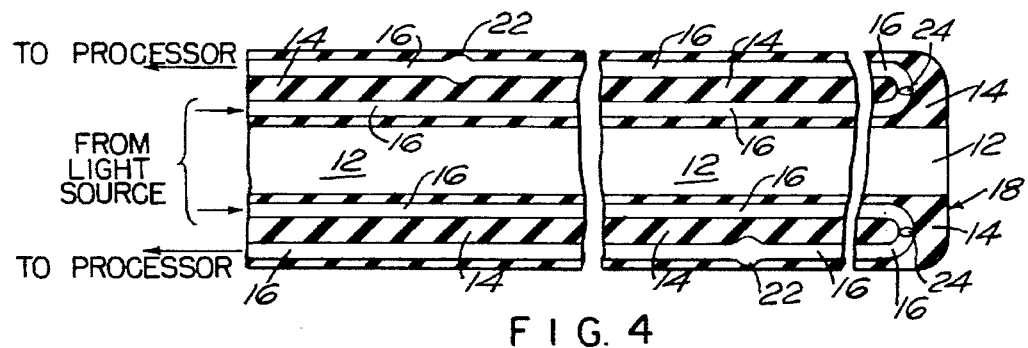
FIG. 4 is a cross sectional side view of the array of FIG. 3 taken along line 4—4 thereof.

FIG. 4 shows a front cross-section of the array of FIG. 3 depicting optical fiber 16 end loops which can either be microbend fiber loops or may be optical welds 24 joining the ends of two parallel fibers as desired to accomodate array construction preferences.

Figure 5:
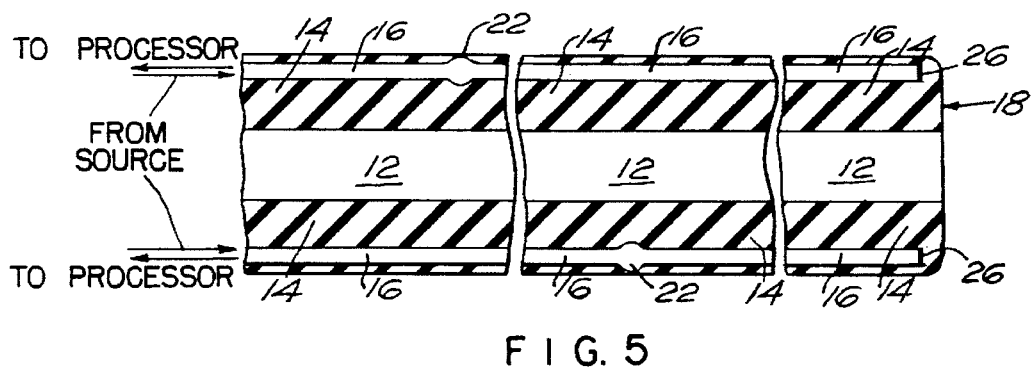
FIG. 5 is a cross sectional side view of another configuration of the array of FIG. 1.

Another approach using a light source located at the dry end of the array is shown in FIG. 5. This configuration uses only single fibers 16, without return lines as shown in FIG. 1, each fiber having a reflective end 26 attached such that the light propagates from the tow platform, through the fiber and hydrophone 22 to the reflective end, and back again through the same fiber and hydrophone to the tow platform. In principle, this increases overall sensitivity, since each light beam passes through its hydrophone twice, but some additional light level is lost due to the increase in the total path length. It is noted that there are several commercially available techniques for producing fibers with such reflective ends.

The advantages and new features of this concept include but are not limited to; a very small array diameter and thus low flow noise, high reliability, low cost and hence disposable, totally optical array with steerable beams, simplicity, and no power delivered to array except in the alternatives shown in FIG. 2 described above.

What has thus been described is a fiber optic bundle towed array having a strength member core, a plurality of longitudinal optic fibers spaced around the bundle near the array outer circumference, each fiber having at least one in-line intensity modulated optical transducer element inserted as a part thereof at a preselected location along the fiber length. Potting material is molded around and embeds the optical fibers and the strength member to form a small diameter integral array unit. The light source can be placed at the wet end or the dry end of the array. In the latter case, the light can be returned to the dry end, either by incorporating a reflective end on each fiber or by having the fiber double back to the dry end, the latter option doubling the effective number of fibers and hence the cross section required. The reflective end configuration on the other hand permits the light beam to pass through the hydrophone twice thus providing greater sensitivity.

Obviously many modifications and variations of the present invention may become apparent in light of the above teachings. For example: the potting material, type of light source, strength member material, and hydrophone type, quantity and spacing may all be varied without deviating from the teachings of the present invention.

In light of the above, it is therefore understood that within the scope of the appended claims, the invention may be practiced otherwise than as specifically described.

What is claimed is:

1. A towed acoustic line array consisting essentially of:
   a central strength member extending along the longitudinal axis of said line array, the proximal end of which is adapted to attach to a tow vessel;

a plurality of intensity modulating fiber optic sensing means, extending essentially parallel to said strength member, for receiving impinging acoustic signals, converting said acoustic signals to proportionally modulated light signals within said sensing means and transmitting said modulated light signals back to said tow vessel for processing, each of said plurality of intensity modulating fiber optic sensing means further comprising a relatively long optical fiber having formed as an integral part thereof at a preselected location therealong at least one in-line intensity modulated optical hydrophone, said hydrophone being capable of receiving said impinging acoustic signals and modulating said light beam passing therethrough in proportion thereto;

potting material, molded around and embedding said plurality of sensing means and said strength member in such a way as to form a neutrally buoyant line array of circular cross section centered around said strength member, the outer surface of said potting material forming the outer surface of said line array while said plurality of sensing means are spaced evenly around the periphery of said strength member just under said outer surface of said potting material, said potting material further comprising a compliant silicone rubber base having preselected fillers distributed therethrough, such that the resulting material is neutrally buoyant and acoustically transparent at preselected acoustic frequencies; and light source means, attached to said plurality of sensing means, for providing a plurality of light beams, one said beam for each of said plurality of sensing means;

whereby an acoustic line array is formed having a diameter of not more than one half of an inch and therefore a corresponding, substantially reduced turbulent flow-noise profile.

2. A line array according to claim 1 wherein said light source means is further connected to said strength member at the wet distal end thereof, said line array further comprising a plurality of electrical conductors extending essentially parallel to said strength member, said conductors being embedded within said potting material in such a way as to connect to said tow vessel at their proximal ends and to said light source means at their distal ends, for providing power to operate said light source means.

3. A line array according to claim 2 wherein said plurality of optical fibers are of a multi-mode type.

4. A line array according to claim 2 wherein said plurality of optical fibers are of a single-mode type and said light source means further comprises a laser.

5. A line array according to claim 1 wherein:

said light source means is located onboard said tow vessel attaching to said plurality of optical fibers thereat, said light source means directing said plurality of light beams into the proximal end of said plurality of optical fibers; and said plurality of optical fibers further having a plurality of reflective surfaces at the distal ends thereof.

6. A line array according to claim 5 wherein said plurality of optical fibers are of a multi-mode type.

7. A line array according to claim 5 wherein said plurality of optical fibers are of a single-mode type and said light source means further comprises a laser.

8. A line array according to claim 1 wherein said plurality of optical fibers each further comprise a light supplying section, an end loop and a light returning section, said end loop being located at the distal end of said array while said light supplying and returning sections extend the length of said line array, each fiber being positioned essentially parallel to all others and to said central strength member, said light source means being located onboard said tow vessel and attaching to the light supply section of said plurality of optical fibers thereat, said light source means directing said plurality of light beams into the proximal end of each said light supplying section.

9. A line array according to claim 8 wherein said plurality of optical fibers are of a multi-mode type.

10. A line array according to claim 8 wherein said plurality of optical fibers are of a single-mode type and said light source means further comprises a laser.

* * * * *